United States Patent
Fisher et al.

(10) Patent No.: US 8,939,478 B2
(45) Date of Patent: Jan. 27, 2015

(54) VEHICLE BUMPERS HAVING OVAL CROSS-SECTION MEMBERS

(75) Inventors: Richard Alan Fisher, Huntington Beach, CA (US); Terry L. Setina, Olympia, WA (US)

(73) Assignee: J.R. Setina Manufacturing Co., Inc., Olympia, WA (US)

( * ) Notice: Subject to any disclaimer, the term of this patent is extended or adjusted under 35 U.S.C. 154(b) by 0 days.

(21) Appl. No.: 13/482,917

(22) Filed: May 29, 2012

(65) Prior Publication Data

US 2013/0134724 A1 May 30, 2013

Related U.S. Application Data

(63) Continuation-in-part of application No. 13/134,471, filed on Jun. 8, 2011, now abandoned.

(60) Provisional application No. 61/397,153, filed on Jun. 8, 2010.

(51) Int. Cl.
*B60R 19/54* (2006.01)
*B60R 19/44* (2006.01)
*B60R 19/52* (2006.01)

(52) U.S. Cl.
CPC ............... *B60R 19/54* (2013.01); *B60R 19/44* (2013.01); *B60R 2019/522* (2013.01)
USPC .......................................... 293/115; 293/142

(58) Field of Classification Search
CPC .... B60R 19/44; B60R 19/54; B60R 2019/522
USPC .................. 293/115, 142–144, 117
See application file for complete search history.

(56) References Cited

U.S. PATENT DOCUMENTS

| | | | | |
|---|---|---|---|---|
| 2,779,620 A * | 1/1957 | Reed | | 280/481 |
| 3,704,031 A * | 11/1972 | Confer | | 280/756 |
| 4,018,466 A | 4/1977 | Norlan | | |
| 4,168,855 A * | 9/1979 | Koch | | 293/115 |
| 6,113,164 A | 9/2000 | Setina | | |
| 6,224,120 B1 * | 5/2001 | Eipper et al. | | 293/118 |
| 6,318,773 B2 | 11/2001 | Storer | | |
| 6,712,410 B2 * | 3/2004 | Kudelko et al. | | 293/102 |
| 6,839,925 B2 * | 1/2005 | Myers | | 5/509.1 |
| 6,905,153 B2 | 6/2005 | Murray et al. | | |
| 7,261,346 B1 | 8/2007 | Kubesh | | |
| 7,306,270 B2 * | 12/2007 | Helms et al. | | 293/106 |
| 7,347,486 B2 | 3/2008 | Uchida et al. | | |
| 2001/0024042 A1 | 9/2001 | Usui | | |
| 2006/0113805 A1 * | 6/2006 | Wakefield | | 293/102 |
| 2011/0006553 A1 * | 1/2011 | Fretz et al. | | 293/115 |
| 2011/0233946 A1 * | 9/2011 | Pellmann et al. | | 293/132 |
| 2012/0205965 A1 * | 8/2012 | Kuan et al. | | 301/95.101 |

* cited by examiner

*Primary Examiner* — Dennis H Pedder
(74) *Attorney, Agent, or Firm* — Klarquist Sparkman, LLP

(57) ABSTRACT

A vehicle bumper for use with police and other emergency vehicles for pushing another vehicle which is fabricated of a tubular loop defining a generally oval cross-section. The oval cross-section tubular loop is oriented such that the major axis of the oval cross-section extends front to back with respect to the host vehicle while the minor axis extends up and down. The vehicle bumper further supports a plurality of resilient pads to aid in controlling the pushed vehicle and to cushion impact transfer between the bumper and the pushed vehicle. The inventive vehicle bumper is substantially stronger and substantially lighter in weight while simultaneously providing a more attractive front view cross-section when mounted on a host vehicle. A plurality of attachments are secured to the tubular loop and are used in securing the vehicle bumper to a suitable portion of a host vehicle.

8 Claims, 11 Drawing Sheets

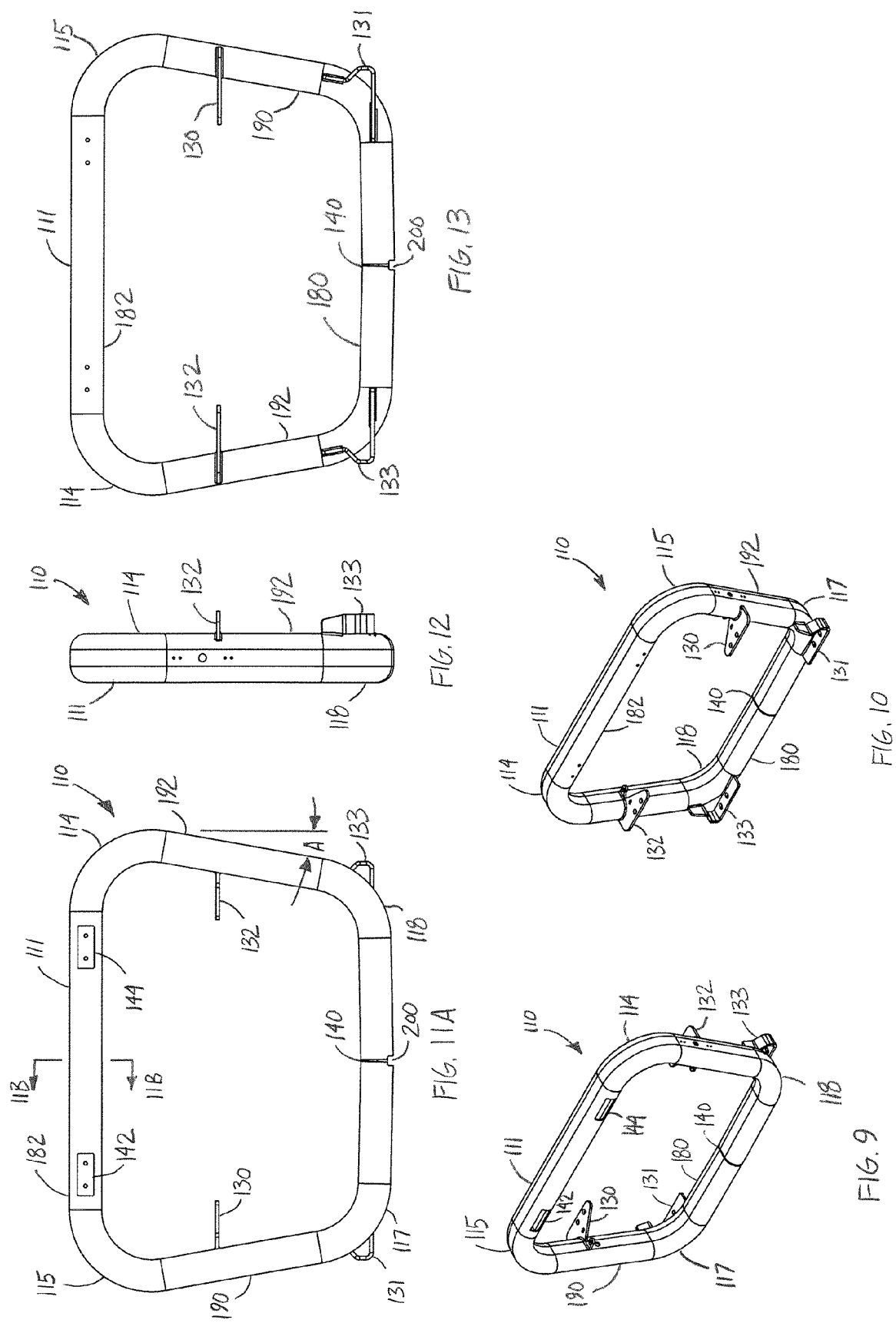

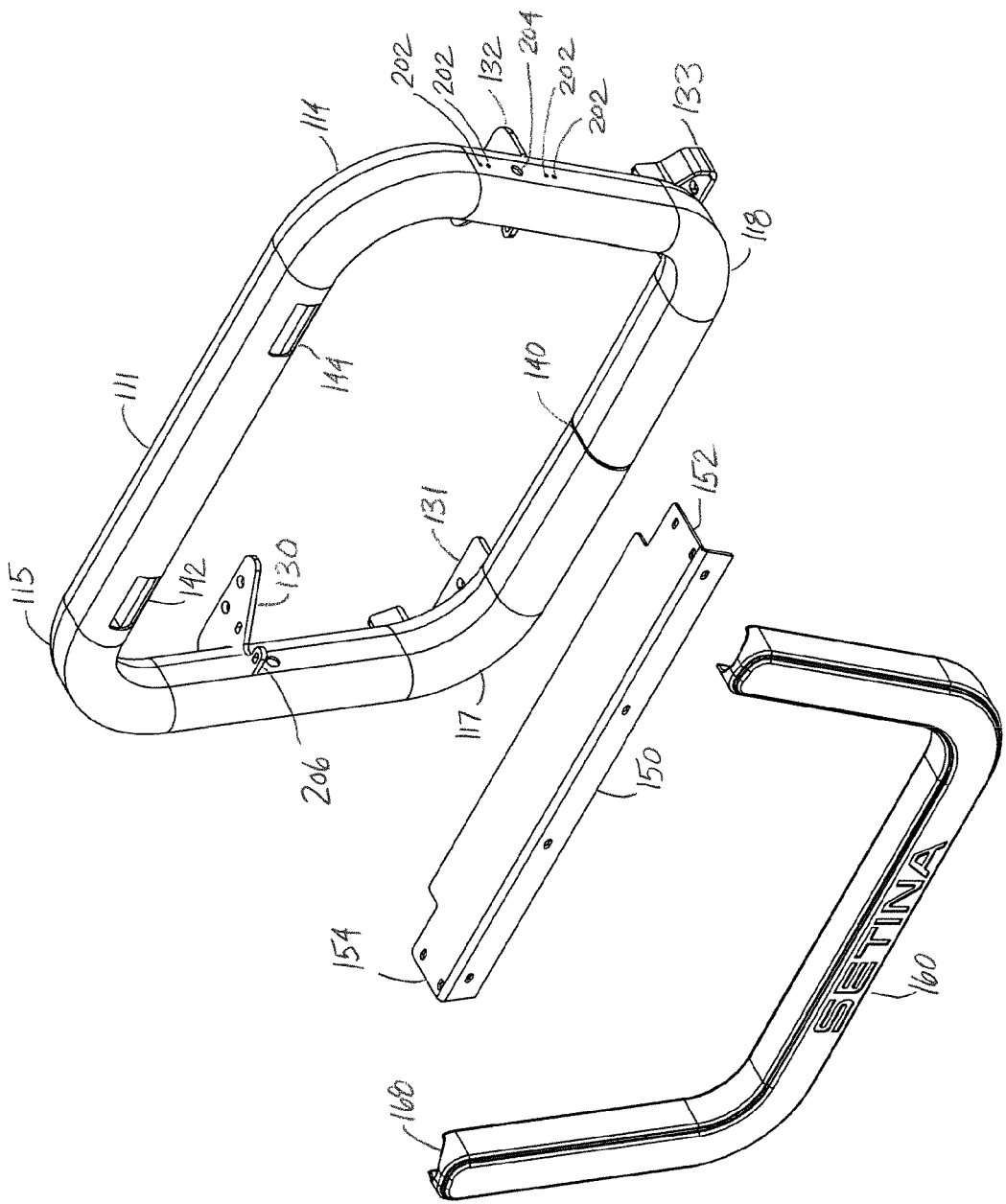

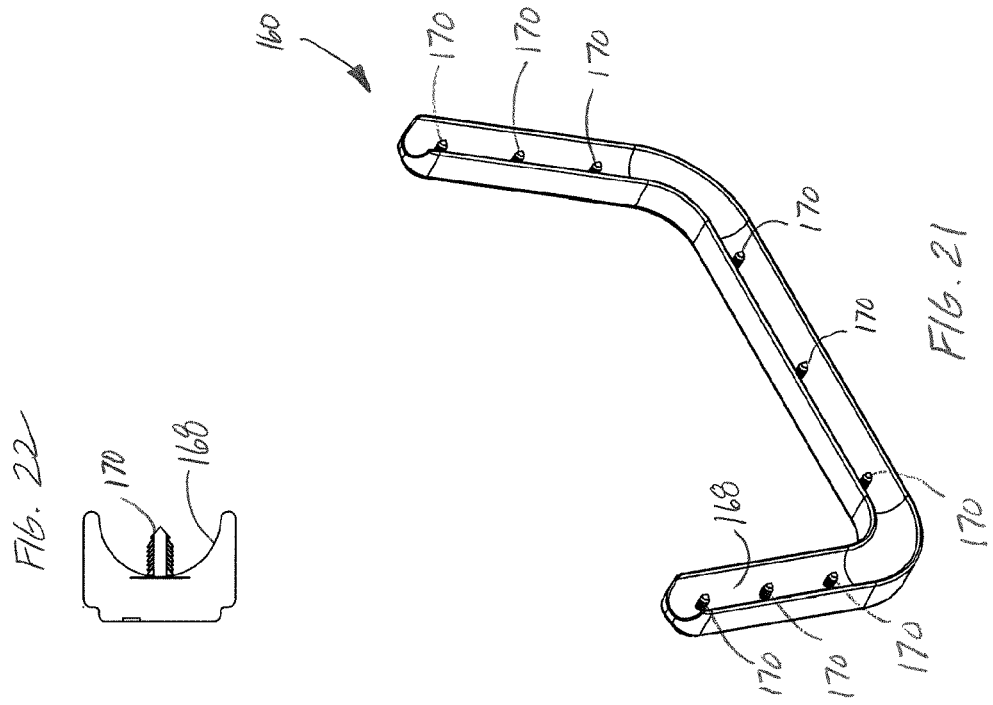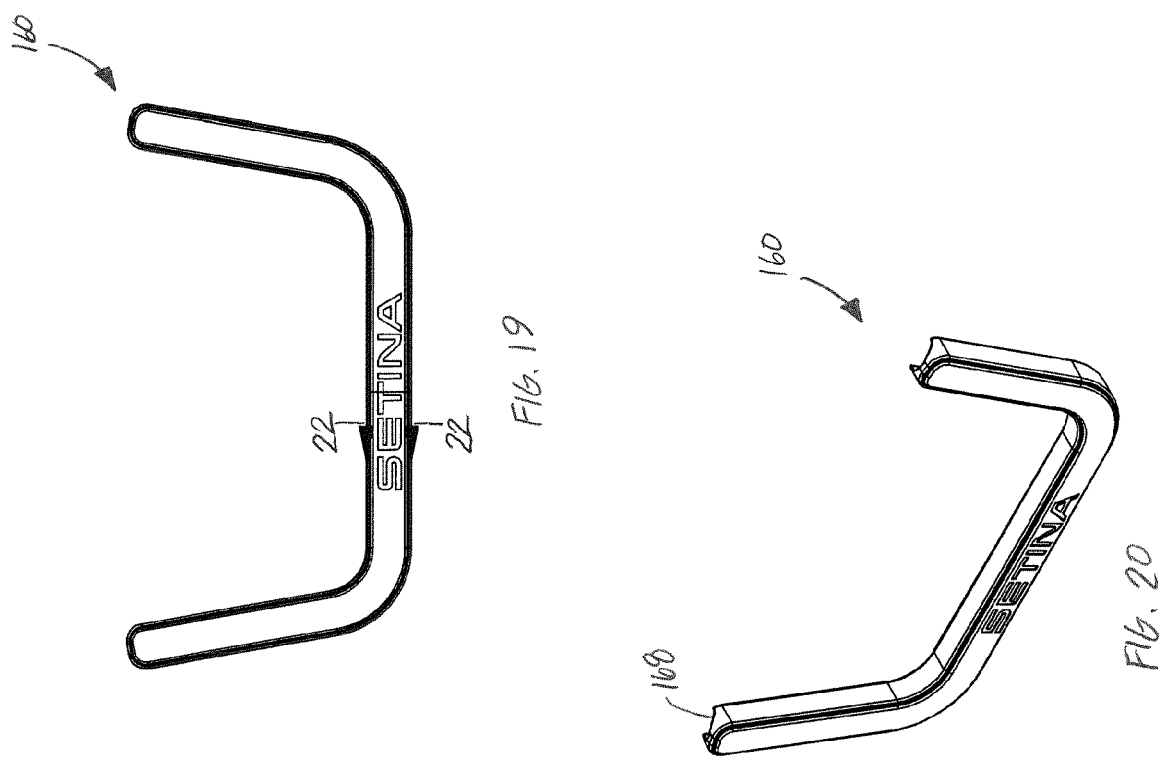

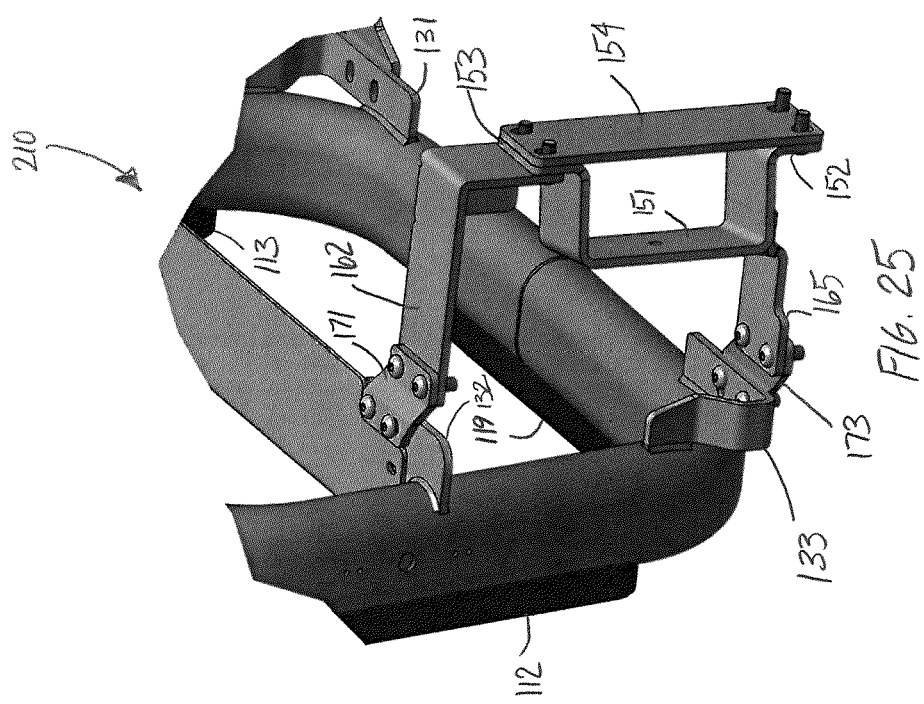

VEHICLE BUMPERS HAVING OVAL CROSS-SECTION MEMBERS

CROSS REFERENCE TO RELATED APPLICATION

This application is a continuation-in-part of U.S. patent application Ser. No. 13/134,471, filed Jun. 8, 2011, now abandoned which claims the benefit of U.S. Provisional Patent Application No. 61/397,153, filed Jun. 8, 2010. Both of which are incorporated herein by reference.

FIELD

This invention relates generally to vehicle bumpers and particularly to bumpers utilized in police, emergency or service type vehicles.

BACKGROUND

A number of different vehicles utilize some type of enhanced front bumper structure suitable for pushing other vehicles. Typically, emergency vehicles such as police vehicles, tow trucks and other emergency response vehicles are provided with a suitably strengthened front bumper which allows the vehicle to push another vehicle for limited distances. In most instances, the pushing activities engaged in by police and other service vehicles involves short distance pushing from behind to allow a disabled or encumbered vehicle to be pushed out of a hazardous or high use position such as a street or freeway lane to a more suitable off the road such as shoulder position.

The typical enhanced bumper utilized by police vehicles and the like comprises a pair of vertical enlarged bumper members which are joined by one or more cross bars. The vertical members and cross bar combination are supported in front of the conventional bumpers of the vehicle. In some instances, the enhanced high strength bumpers are secured to a suitable support or suitable support points provided in the vehicle structure. In other instances, the bumpers are secured to the conventional bumper attachment points within the vehicle. In either event, the object is to provide a suitably robust high-strength front bumper structure which allows the host vehicle to be able to push inoperative vehicles for short distances. While presently available enhanced front bumpers utilized by police vehicles and other emergency responders have enjoyed some success, they remain subject to several limitations.

The most common type of enhanced bumper utilized by police and other emergency vehicles includes a pair of robust vertical structural members positioned ahead of the conventional front bumper of the vehicle. The robust vertical structural members are secured to the vehicle support system. The vertical members are further supported by a plurality of cross members which may also be utilized to support one or more emergency lights or sounding apparatus.

One of the serious limitations of the conventional vertical member type enhanced bumpers described above arises in that the entire strength of the enhanced bumper system resides in the two vertical spaced apart structural members. The cross bars are frequently lighter in scale and often function primarily to support auxiliary apparatus such as lights and sounding devices. In addition, such vertical structural member type enhanced bumper systems often fail to "match up" with certain types of vehicle rear bumpers or certain "atypical" structured vehicles such as small service trucks, pickups or vans.

U.S. Pat. No. 6,905,153 issued to Murray, et al. sets forth a PUSH BUMPER having a pair of vertical structural members together with apparatus for securing the vertical members to a conventional vehicle bumper. The vertical members are joined by a generally planar cross member which defines a generally V-shaped frontal portion.

U.S. Pat. No. 6,113,164 issued to Setina sets forth an AUXILIARY PUSH BUMPER FOR MOTOR VEHICLE which is clamped to the original bumper of the host vehicle by brackets attached to bumper guards on the push bumper. The push bumper is fabricated of a plurality of bumper sections formed of extruded aluminum and having ends which are releasably attached to the bumper guards for easy repair of the push bumper. In one embodiment, the push bumper includes a center section formed of an extruded aluminum U-shaped channel with a diagonal stiffening plated inserted into the channel. The center section is fastened at its opposed ends to a pair of bumper guards. A pair of curved side sections are fastened at their inner ends to the bumper guard plates and are further fastened at their outer ends to the frame of the host vehicle.

U.S. Pat. No. 6,318,773 issued to Storer sets forth a PUSH BAR MOUNTING SYSTEM for mounting a push bar to a vehicle bumper without significant damage to the bumper. The system includes a front and rear bracket mounted to an inner bumper of the vehicle and having top and bottom mounting tabs extending away from the inner bumper. The brackets are configured to attach to the inner bumper of the vehicle without drilling mounting holes therein. Additionally, the mounting tabs are configured to extend through a bumper fascia that surrounds the inner bumper.

U.S. Pat. No. 4,018,466 issued to Norlin sets forth a VEHICLE BUMPER ASSEMBLY having at least one profiled preferably U-shaped beam or the like adapted to be securely mounted to the frame and/or the bumper of a host vehicle. This mounting is carried forward whereby the outer contours of the bumper are located outside the vehicle body and are active in the shock absorbing capacity. The beam is provided with a plurality of stays or plates which extend transversely between the longitudinally extending limb portions of the beam and which divide the beam into pocket-like sections in which the inserts are individually mounted and arranged. The inserts preferably comprise cellular blocks and consist of a number of tubes of semi-elastic or plastic material.

While the foregoing described prior art devices have to some extent improved the art and have in some instances enjoyed commercial success, there remains nonetheless a continuing and unresolved need in the art for evermore improved robust vehicle bumper apparatus suitable for use in pushing other vehicles.

SUMMARY

Described below are various implementations of a vehicle bumper that addresses shortcomings of the prior art.

According to one implementation, a vehicle push bumper comprises a tubular member and a plurality of attachment members. The tubular member is configured in a loop and has a generally oval cross-section with a major axis and a minor axis. The tubular member comprises upright sections extending between first and second lateral sections, and the upright sections slant outwardly between the first and second lateral sections. The plurality of attachment members are secured to the tubular member.

The tubular member can have a generally trapezoidal shape. The upright sections can slant outwardly by about 7 to about 15 degrees from vertical. The upright sections can slant outwardly by about 10 degrees from vertical.

The plurality of attachment members can include at least a pair of attachment members adjacent one of the first and second lateral sections. The plurality of attachment members can include at least a pair of attachment members positioned between the first and second lateral members.

An intermediate lateral member can be positioned between the first and second lateral sections. The intermediate lateral member can have ends mounted at respective mounting portions of the pair of attachment portions positioned between the first and second lateral members.

The vehicle push bumper can have a U-shaped resilient pad mounted to the tubular member. The U-shaped resilient pad can be configured to extend from one upright section, over one of the lateral sections to the other upright section.

One of the first and second lateral sections can be formed with openings shaped to receive lights for recessed mounting within the bumper. At least one of the upright sections can be formed with holes for mounting auxiliary lights and running wiring for the auxiliary lights through the tubular member.

The tubular member can be formed by bending, and its ends can be partially joined together by welding. The tubular member can be formed with a drain opening. The tubular member can be formed of any suitable material, e.g., aluminum or steel.

When the vehicle push bumper is installed on a vehicle, the major axis of the oval cross section is generally level and the minor axis is generally vertical. The generally oval cross section can include generally semicircular forward and rearward portions and generally straight intermediate portions connecting the forward and rearward portions.

It is desired to provide improved vehicle bumpers for use with police and other emergency type vehicles, particularly vehicle bumpers with a robust high strength pushing member combination which is able to interact with a great variety of differently configured vehicle rear portions during pushing activity. It is desirable for such bumpers to be as light in weight as is practical.

BRIEF DESCRIPTION OF THE DRAWINGS

The foregoing and other features and advantages will become more apparent from the following detailed description, which proceeds with reference to the accompanying figures.

FIG. 9 sets forth a front and left side perspective view of a vehicle bumper constructed in accordance with another implementation;

FIG. 10 sets forth a rear and right side perspective view of the vehicle bumper of FIG. 9;

FIG. 11A sets forth a front elevation view of the vehicle bumper of FIG. 9;

FIG. 12 sets forth a left side elevation view of the push bumper of FIG. 9;

FIG. 13 sets forth a rear elevation view of the vehicle bumper of FIG. 9;

FIG. 18 is an exploded perspective view of the vehicle bumper of FIG. 14;

FIG. 19 is a front elevation view of an implementation of the resilient pad;

FIG. 20 is a front and left side perspective view of the resilient pad of FIG. 19;

FIG. 21 is a rear and left side perspective view of the resilient pad of FIG. 19;

FIG. 22 is a section view of the resilient pad taken along the line 22-22 in FIG. 19;

FIG. 25 is an enlarged view of a portion of FIG. 24.

DETAILED DESCRIPTION

Figure 1:
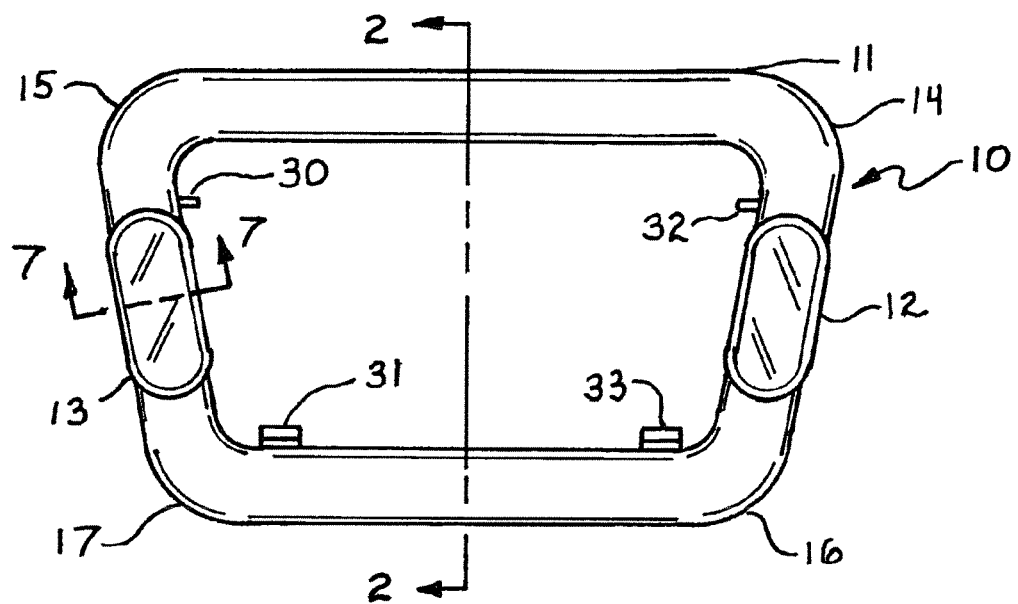
FIG. 1 sets forth a front view of a vehicle bumper constructed in accordance with the present invention.

FIG. 1 sets forth a front view of a vehicle bumper constructed in accordance with the present invention and generally referenced by numeral 10. Vehicle bumper 10 is formed as a tubular loop or member 11 having a generally trapezoidal shape and rounded corner portions 14, 15, 16 and 17. As is better seen in FIG. 2, the cross-section shape of tubular loop 11 comprises an oval rather than the circular cross-section employed by conventional prior art structures.

Figures 7, 8:
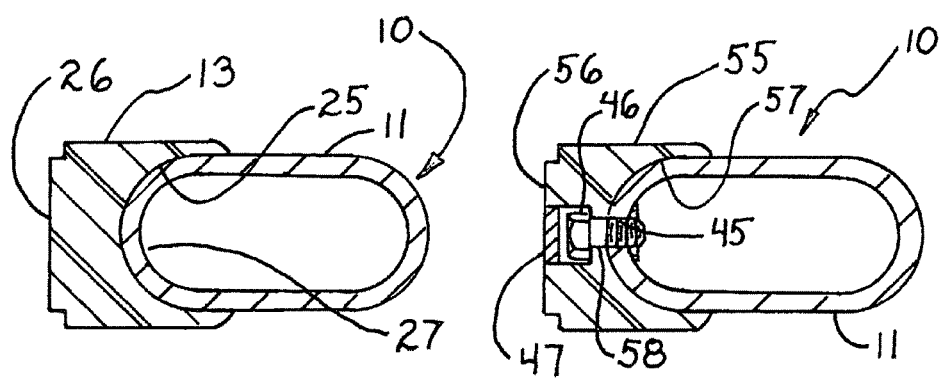
FIG. 7 sets forth a section view of a vehicle bumper constructed in accordance with the present invention taken along section lines 7-7 in FIG. 1.
FIG. 8 sets forth a section view taken along section lines 7-7 in FIG. 1 showing an alternate embodiment attachment for the resilient pad portion of the present invention vehicle bumper.

Returning to FIG. 1, bumper 10 further includes a pair of resilient pads 12 and 13 secured to the front portion of the vertical members of tubular loop 11. Resilient pads 12 and 13 are preferably fabricated of a rubber material and are preferably secured to the underlying surfaces of tubular loop 11 utilizing a conventional high strength adhesive attachment. Alternatively, pads 12 and 13 may be secured utilizing a fastener attachment as shown in FIG. 8. While pads 12 and 13 are preferably fabricated of a resilient rubber material, pads 12 and 13 may if desired be fabricated of a different suitably resilient and durable material such as molded plastic or the like. The important functional aspect provided by pads 12 and 13 is the provision of padded resilient surfaces upon the front engaging edges of tubular loop 11 which avoid damage to paint or underlying surfaces of vehicles being pushed while providing sufficient friction to enhance the control exercisable by the vehicle operator during pushing operations.

It will be noted that FIG. 1 shows the present invention vehicle bumper in its simplest embodiment in which the bumper makes use of the novel oval cross-section tubular structure. The present invention enhanced and improved vehicle bumper for use on emergency and police type vehicles provides a substantially lighter weight and higher strength vehicle bumper through this use of oval cross-section tubular material rather than the conventional circular cross-section tubular material employed by prior art bumpers. This use of oval cross-section tubular material provides a substantially greater strength for any selected bumper weight or material thickness compared to the strength provided by corresponding typical circular cross-section tubular bumpers. In addition, because the major axis of the oval cross-section bumper material of the present invention is oriented forward to rearward with respect to the vehicle, the vehicle bumper is substantially "thinner" in visual appearance when viewed from the front of the host vehicle than are similar strength circular cross-section tubular bumpers. The thinner profile of the present invention bumper together with its greater strength and reduced weight substantially enhances the appeal and efficiency of the present invention bumper system. Additionally, the provision of a plurality of hard rubber pads secured upon the forward surfaces of the tubular loop provide protection for the bumper structure as well as protection of the surfaces of the vehicle being pushed.

In the fabrication of the present invention, the resilient pads are sufficiently hard to be durable while nonetheless sufficiently resilient to avoid damage to paint and other vehicle surfaces during pushing operations. In addition and as is mentioned above, the rubber pad materials utilized, which may alternatively be formed of a rubber substitute such as resilient plastic or the like, also enhance the friction between the vehicle bumper and the surfaces of the vehicle being pushed. This enhanced friction in turn contributes to greater control being exercisable by the vehicle operator during pushing activities. The present invention vehicle bumper is securable to existing vehicle supports in any of the selected available bumper attachment methods of the type utilized in prior art presently available bumpers. It will be further noted by comparison of FIGS. 1 and 3 that the present invention bumper may be fabricated in an alternative manner to provide additional resilient pads on the top and bottom portions of the tubular loop and may also include a horizontal cross bar within the tubular loop to support light and sound apparatus as needed.

Figure 2:
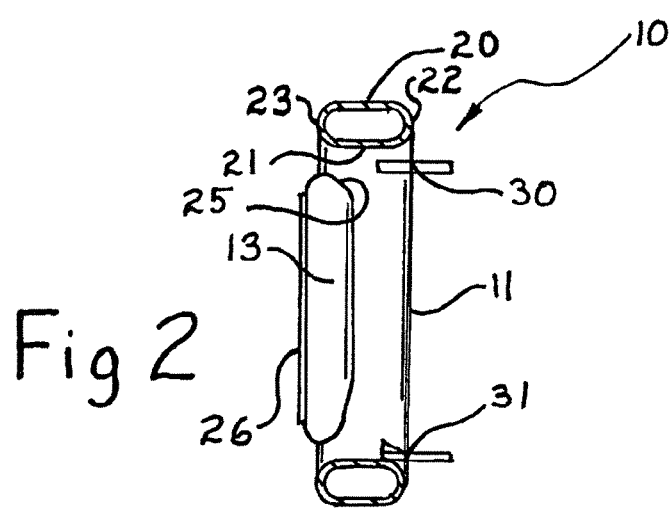
FIG. 2 sets forth a section view of the vehicle bumper shown in FIG. 1 taken along section lines 2-2 therein.

FIG. 2 sets forth a section view of vehicle bumper 10 taken along section lines 2-2 in FIG. 1. As described above, vehicle bumper 10 includes a tubular loop 11 formed to define an oval cross-section. As is also described above, vehicle bumper 10 further supports a pair of resilient pads such as pad 13. Vehicle bumper 10 further includes an upper attachment 30 and a lower attachment 31 secured to tubular loop 11 by conventional welding attachment. Returning to FIG. 1, it will be noted that an additional upper attachment 32 and lower attachment 33 are also supported upon tubular loop 11.

Figure 3:
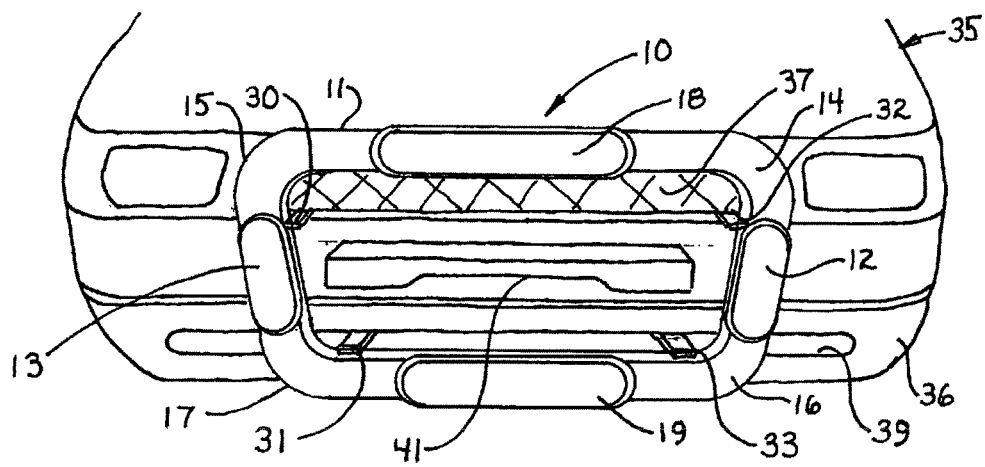
FIG. 3 sets forth a partial front perspective view of a typical host vehicle supporting a vehicle bumper constructed in accordance with the present invention.
Figure 4:
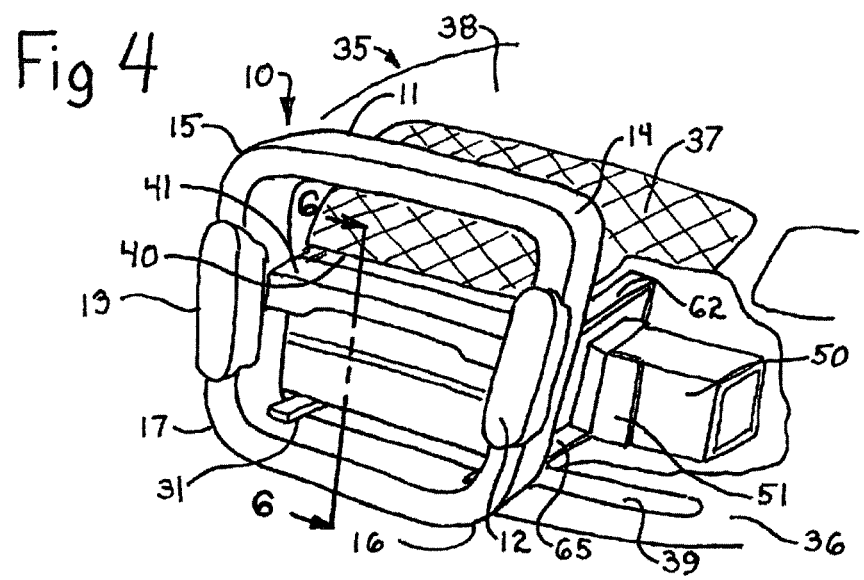
FIG. 4 sets forth a partially sectioned partial front perspective view of a host vehicle supporting a vehicle bumper constructed in accordance with the present invention.
Figure 5:
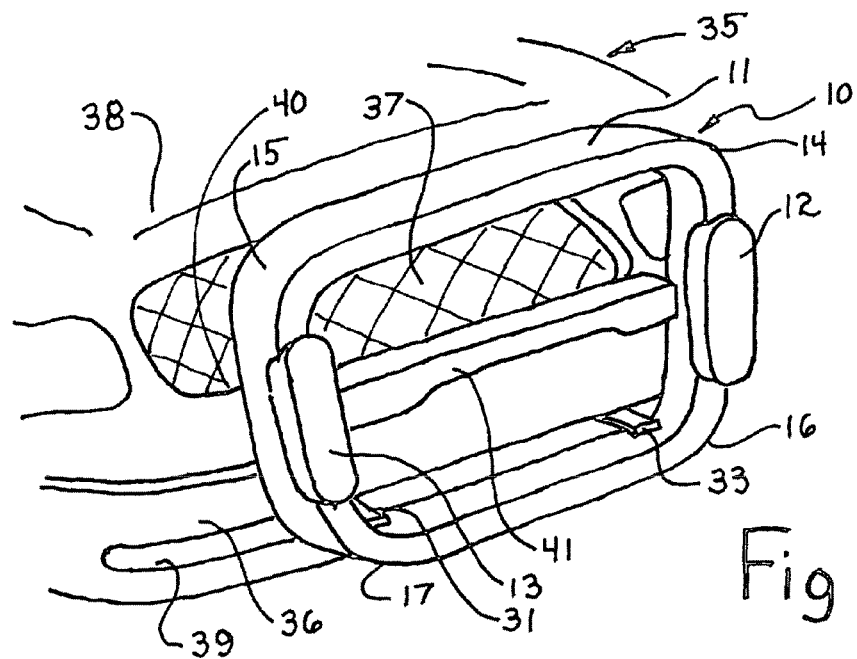
FIG. 5 sets forth a partial front perspective view of a host vehicle supporting a vehicle bumper constructed in accordance with the present invention.

As is better seen in FIGS. 3 through 5, tubular loop 11 of vehicle bumper 10 is secured to the front portion of a host vehicle by attachment of suitably fabricated brackets to engage attachments 30 through 33 of vehicle bumper 10.

Returning to FIG. 2, it will be noted that the cross-section shape of tubular loop 11 defines an oval having flat portions 20 and 21 joined by a pair of cylindrical portions 22 and 23. This oval fabrication of tubular loop 11 greatly increases the strength of vehicle bumper 10 without increasing its weight. Stated otherwise for any given weight of tubular loop 11, substantial greater strength is provided by the oval cross-sectional shape thereof than would be provided by a corresponding weight circular cross-section vehicle bumper. As mentioned above, resilient pad 13 is preferably fabricated of a resilient rubber material or its equivalent. Resilient bumper 13 defines a cylindrical portion 25 which is secured in contact with the cylindrical portion 23 of tubular loop 11. Resilient pad 13 further defines a generally planar front surface 26 intended to engage vehicles during pushing activity. With temporary reference to FIGS. 7 and 8, it will be noted that FIG. 7 shows a cross-section view of pad 13 utilizing an adhesive attachment between pad 13 and tubular loop 11. Examination of FIG. 8 shows that an alternate form of attachment may be utilized in securing resilient pad 13 to semi-cylindrical portion 23 of tubular loop 11 utilizing a conventional fastener.

Returning to FIG. 2, it will be apparent to those skilled in the art that the remaining pads utilized on vehicle bumper 10 (resilient pad 12 seen in FIG. 1) are secured to tubular loop 11 in a similar fashion.

FIG. 3 sets forth a partial front perspective view of a typical police vehicle supporting vehicle bumper 10. As described above, vehicle bumper 10 is formed of a tubular loop 11 defining an oval cross-section as shown in FIG. 2. Tubular loop 11 defines a generally trapezoidal shaped having straight side, top and bottom portions and rounded corners 14, 15, 16 and 17. As is also described above, vehicle bumper 10 supports resilient pads 12 and 13. In FIG. 3, vehicle bumper 10 is shown supporting additional resilient pads 18 and 19 secured to the upper and lower horizontal segments of tubular loop 11. Vehicle bumper 10 further includes a pair of upper attachment brackets 30 and 32 and a pair of lower attachment brackets 31 and 33. In the manner shown in FIGS. 4, 5 and 6, attachment brackets 30 through 33 are utilized in securing bumper 10 upon the host vehicle.

Vehicle 35 is shown to represent a typical police vehicle often described in the art as a "cruiser" in which a more or less conventional vehicle has been adapted for use as a police vehicle. While numerous modifications are typically made to vehicles utilized as cruises by police officers, for the most part the outer appearance of vehicle 35 is substantially normal. Thus, vehicle 35 supports an outer front bumper 36 defining a bumper vent 39 extending along the lower portion of bumper 36. Vehicle 35 further includes a grille 37 and a hood 38. As is better seen in FIG. 4, a convenient gap exists in the frontal portion of vehicle 35 between the lower edge of grille 37 and the upper adjacent surface of outer bumper 36. This gap is utilized to extend an appropriate support member therethrough and secure attachments 30 and 32 to be internal collision bumper of vehicle 35 in the manner shown in FIG. 6. Additionally, bumper vent 39 is utilized to provide a similar attachment between the internal crash bumper of vehicle 35 and lower attachments 31 and 33 also in the manner shown in FIG. 6. The attachment of bumper 10 upon vehicle 35 is set forth below in FIGS. 4, 5 and 6 and described in greater detail therein. However, suffice it to note here that vehicle bumper 10 supporting resilient pads 12, 13, 18 and 19 is securely mounted upon vehicle 35 forwardly from outer bumper 36. In most vehicles, outer bumper 36 is a resilient bumper fabricated of a resilient plastic material or the like. Thus in a typical application, it is anticipated that vehicle bumper 10 is supported upon vehicle 35 by attachment to the crash absorbing inner bumper (seen in FIG. 4) or, alternatively, is coupled to the supporting frame of the host vehicle (not shown). It will be noted that in the support of vehicle bumper 10 upon vehicle 35 shown in FIG. 3 that attachment is made to attachments 30 and 32 by support members extending through a gap 40 formed between grille 37 and the upper surface of outer bumper 36. In addition, it will be noted that attachment is made to lower attachments 31 and 33 by structural elements extending through bumper vent 39.

FIG. 4 sets forth a partial perspective view of vehicle 35 which is partially sectioned to show a typical attachment for vehicle bumper 10. In the example shown in FIG. 4, the attachment is made to the vehicle's crash absorbing inner bumper 50. It will be understood, however, that the present invention vehicle bumper may be secured to either crash bumper 50 or a suitable portion of the vehicle supporting frame (not shown) without departing from the spirit and scope of the present invention. It has been found that attachment to crash absorbing bumper 50 provides advantage in that vehicle bumper 10 then is afforded the energy absorbing characteristic provided by interior bumper 50 should a severe impact to bumper 10 be received. It will also be noted by comparison of FIGS. 3 and 4 that vehicle bumper 10 is shown in FIG. 4 without resilient pads 18 and 19. This is a matter of choice in the utilization of vehicle bumper 10. It will be noted in FIGS. 3 and 4 that a cross member 41 extends horizontally within the interior of tubular loop 11. Cross member 41 is secured to the interior of tubular loop 11 using conventional fabrication such as welding attachment or using suitable brackets (not shown). Cross member 41 provides a convenient area within vehicle bumper 10 for mounting apparatus such as lights or sound producing equipment such as a "hailer" or the like. Additionally, a sound producing apparatus such as a siren may, if desired, be supported upon cross member 41.

More specifically and as is described above, vehicle 35 includes an outer bumper 36, a grille 37 and a hood 38. As is also described above, a gap 40 is formed between the lower edge of grille 37 and the upper surface of outer bumper 36. FIG. 4 also shows an internal crash absorbing bumper 50 supported within the interior of vehicle 35 in accordance with conventional fabrication techniques. Thus, while not shown in FIG. 4, it will be understood that crash absorbing bumper 50 is positioned behind outer bumper 36 and is coupled to the supporting frame of vehicle 35 (not shown) through an energy absorbing structure. Such internal crash absorbing bumpers are well known in the art and have been utilized in vehicles for many years. Suffice it to note here that crash absorbing bumper 50 is supported with sufficient strength to provide a convenient attachment point for attaching the support apparatus utilized to further support vehicle bumper 10. The structure utilized in coupling vehicle bumper 10 to crash absorbing internal bumper 50 is set forth below in FIG. 6 in greater detail. However, suffice it to note here that this apparatus includes a U-shaped bracket 51 which is fitted upon crash absorbing bumper 50 and which is secured by a back plate 54 (seen in FIG. 6). In addition, U-shaped bracket 51 further supports an upper arm 62 which passes forwardly through gap 40 and beyond and which is secured to attachment 32 of bumper 10 (seen in FIG. 3). Finally, U-shaped bracket 51 further supports a lower arm 65 which extends forwardly through bumper 39 and is secured to attachment 33 of vehicle bumper 10. It will be understood that a corresponding structure is secured on the remaining side of vehicle bumper 10 securing attachments 30 and 31 to crash absorbing bumper 50.

As is described above, vehicle bumper 50 includes a generally trapezoidally shaped tubular loop 11 having corner portions 14, 15, 16 and 17 and further supporting a pair of resilient pads 12 and 13. In accordance with the present invention, tubular loop 11 is formed to define a generally oval cross-section seen for example in FIG. 2. It will also be noted that in FIG. 4 vehicle bumper 10 does not utilize resilient pads 18 and 19. It will be understood, however, that resilient pads 18 and 19 may, if desired, be secured to vehicle bumper 10 in the manner shown in FIG. 3. A cross member 41 is supported by the interior of tubular loop 11 and occupies a generally horizontal position which, as described above, may be utilized for supporting additional apparatus such as lights and sound apparatus.

In the embodiment of the present invention shown in FIG. 4, the attachment of vehicle bumper 10 to internal crash absorbing bumper 50 is carried forward substantially in accordance with conventional fabrication techniques. As mentioned above, the attachment of vehicle bumper 10 supports to internal crash bumper 50 is opportune in that it provides an energy absorbing support for vehicle bumper 10.

FIG. 5 sets forth a partial perspective view of vehicle 35 supporting vehicle bumper 10. As described above, vehicle 35 includes an outer bumper 36 defining a bumper vent 39. As is also described above, vehicle 35 includes a hood 38 and a grille 37. A gap 40 is formed between the lower edge of grille 37 and the upper surface of outer bumper 36. Vehicle bumper 10 is formed of a generally trapezoidal tubular loop 11 defining straight portions joined by curved corner portions 14, 15, 16 and 17. Vehicle bumper 10 further supports resilient pads 12 and 13. In the manner described above, vehicle bumper 10 is secured to a selected internal portion of vehicle 35.

Figure 6:
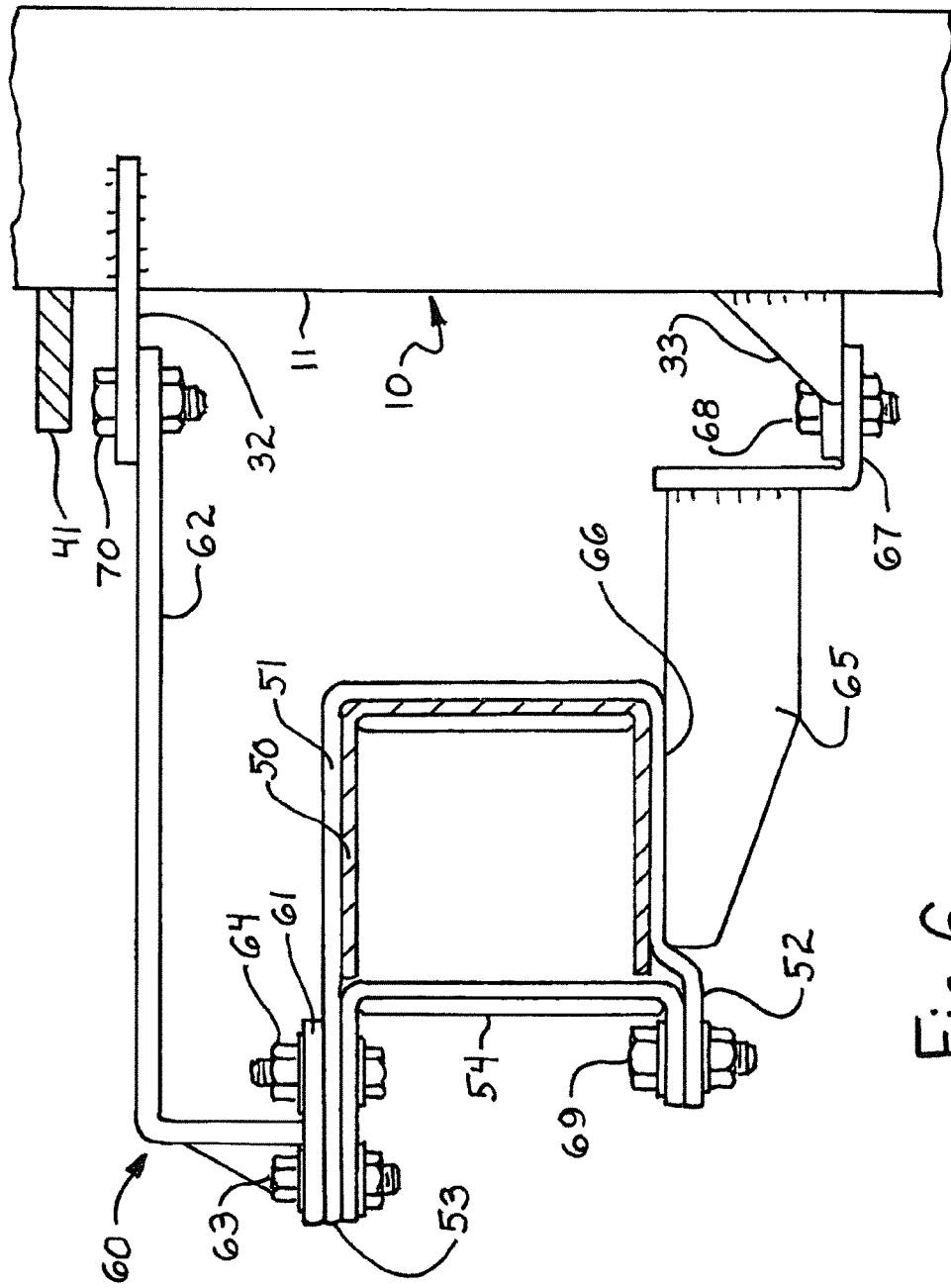
FIG. 6 sets forth a section view of a vehicle bumper attachment supporting a vehicle bumper constructed in accordance with the present invention upon the front bumper of a host vehicle.
Figure 11B:
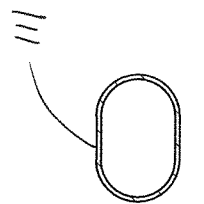
FIG. 11B sets forth a section view of the tubular loop of FIG. 9 taken along the line 11B-11B in FIG. 11A.
Figure 17:
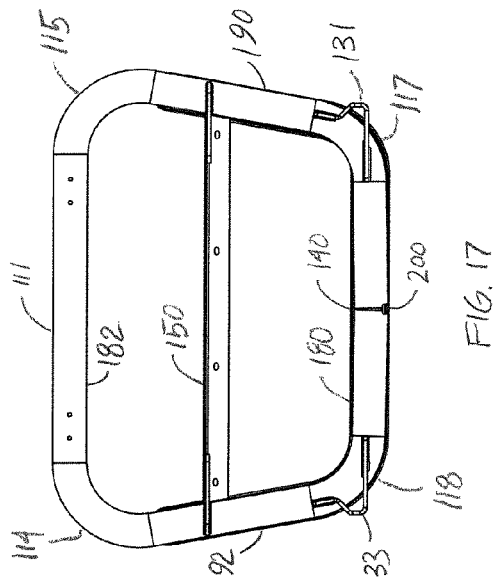
FIG. 17 is a rear elevation view of the vehicle bumper of FIG. 14.
Figure 16:
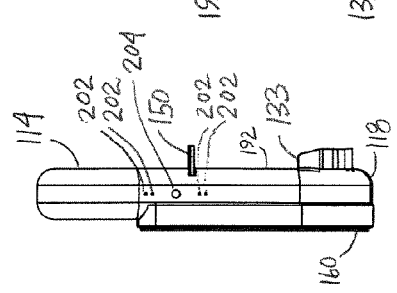
FIG. 16 is a left side elevation view of the vehicle bumper of FIG. 14.
Figure 15:
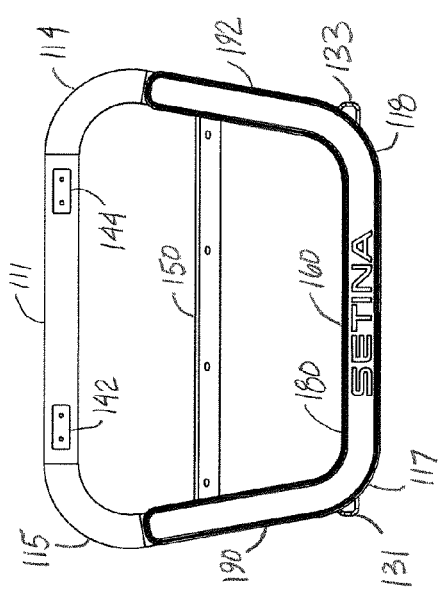
FIG. 15 is a front elevation view of the vehicle bumper of FIG. 14.
Figure 14:
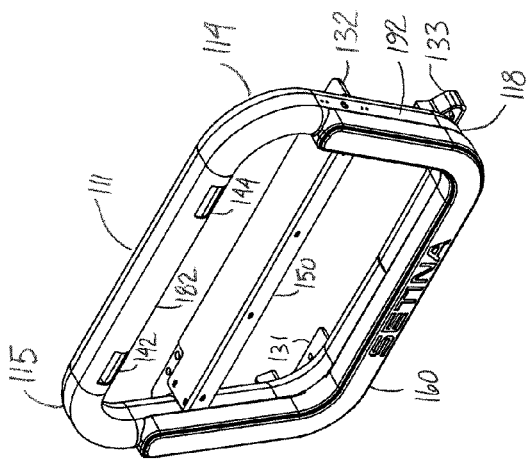
FIG. 14 is a front and left side perspective view of the vehicle bumper of FIG. 9, together with an intermediate cross-member and an attached resilient pad.

FIG. 6 sets forth a partial section view of a typical attachment of vehicle bumper 10 to an internal crash absorbing bumper 50 supported within vehicle 35 in accordance with conventional fabrication techniques. A generally U-shaped bracket 51 is fitted upon crash absorbing bumper 50 and includes a rearwardly extending upper end 53 and a rearwardly extending lower end 52. A generally planar doubly flanged back plate 54 is fitted against the rear portion of crash absorbing bumper 50 and is positioned against the underside of upper end 53 and the upper side of lower end 52. A conventional nut and bolt fastener 69 secures the lower end of back plate 54 to lower end 52 of U-shaped bracket 51. A lower arm 65 is joined to the bottom surface of U-shaped bracket 51 at a weld joint 66. Lower arm 65 extends forwardly to support an arm bracket 67. An upper attachment bracket 60 includes a flange 61 received upon the upper surface of upper end 53. A pair of conventional nut and bolt fasteners 63 and 64 secure back plate 54 and flange 61 to upper end 53 of U-shaped bracket 51. Upper attachment bracket 60 extends forwardly forming an upper arm 62.

As described above, vehicle bumper 10 includes a tubular loop 11 formed to define an oval cross-section and having an upper attachment 32 and a lower attachment 33. Upper attachment 32 is secured to upper arm 62 by a conventional nut and bolt fastener 70 while lower attachment 33 is joined to arm bracket 67 by a conventional nut and bolt fastener 68. Vehicle bumper 10 also includes a cross member 41.

It will be apparent to those skilled in the art that the structure shown in FIG. 6 which provides supports for attachments 32 and 33 of tubular loop 11 is repeated on the opposite side of vehicle 35 and provides corresponding support for attachments 30 and 31 (seen in FIG. 3). Examination of FIG. 6 shows that tubular loop 11 is oriented such that the major axis of its oval cross-section extends front to rear while the minor axis thereof extends top to bottom. This orientation provides the slimmest appearance when observed from the vehicle front and provides the strongest force resisting structure to forces imparted to the frontal edge of tubular loop 11. In this manner, vehicle bumper 10 may be fabricated as light as possible and as strong as possible while maintaining a more attractive frontal appearance.

FIG. 7 sets forth a section view of vehicle bumper 10 taken along section lines 7-7 in FIG. 1. As described above, vehicle bumper 10 includes a tubular loop 11 defining an oval cross-section. As is also described above, resilient pad 13 defines a planar surface 26 and a generally cylindrical interior surface 25. In the embodiment shown in FIG. 7, resilient pad 13 is received upon the forward portion of tubular loop 11 and is secured thereto by an adhesive material 27.

FIG. 8 sets forth a section view of vehicle bumper 10 utilizing an alternate embodiment for securing a resilient pad to tubular loop 11. The embodiment shown in FIG. 8 is substantially identical to the embodiment shown in FIG. 7 in that tubular loop 11 defines an oval cross-section having a generally cylindrical frontal edge. A resilient pad 55 fabricated in general similarity to resilient pad 13 defines an internal cylindrical surface 57 for receiving the forward portion of tubular loop 11. The embodiment shown in FIG. 8 differs from the embodiment of FIG. 7, however, in that it accommodates a conventional nut and bolt fastener for securing resilient pad 55 upon tubular loop 11. Accordingly, to accommodate this different form of attachment, tubular loop 11 defines an aperture 45 in the frontal portion thereof. Correspondingly, resilient pad 55 defines an aperture 58 extending inwardly from planar face 56. A conventional nut and bolt fastener 46 extends through aperture 58 and aperture 45 and is secured in place by a conventional cooperating threaded nut. To maintain the resilient character of frontal surface 56 of resilient pad 55 and to avoid damage to a vehicle being pushed which might otherwise be caused by fastener 46, a recessed plug 47 formed of a resilient rubber or plastic material is secured to resilient pad 55 by snap-fit or adhesive attachment.

FIGS. 9-21 show an alternative vehicle bumper 110. In the figures, elements in common with the previously described elements are generally numbered with the same reference numeral plus 100, in most cases.

The vehicle bumper 110 is formed as a tubular loop or member 111 having a generally trapezoidal or "heart" shape with rounded corner portions 114, 115, 116 and 117. As described above and best shown in FIG. 11B, the tubular loop 111 has a generally oval cross-sectional shape.

Referring to FIG. 11A, which shows a front elevation view of the vehicle bumper 110, upright sections 190, 192 angle outwardly by an angle A as they rise from the level of a lower lateral or cross member 180 to an upper lateral or cross member 182. Specifically, the angle A is in the range of about 7 degrees to about 15 degrees. In the illustrated implementation, the angle A is approximately 10 degrees. It has been found that the providing the generally trapezoidal shape of the loop 111 with the outwardly angled upright sections 190, 192 provides for greater operability of the bumper particularly in maintaining contact with vehicles that are being pushed with the bumper, particularly as turns are negotiated.

As indicated, the bumper 110 can include a pair of lower attachments 131, 133. These attachments are configured to suit the particular vehicle to which the bumper 111 is to be mounted. In the illustrated implementation, the lower attachments 131, 133, as best seen in FIGS. 10 and 13, have upper ends attached to the upright sections 190, 192/rounded corner portions 117, 118, and lower ends attached to the lower cross member 180. The attachments 131, 133 are preferably connected to the tubular loop 111 by welding. The attachments 131, 132 may have outer extents that protrude beyond the periphery of the tubular loop 111, as best shown in FIG. 11.

Upper attachments 130, 132 extend from the upper upright sections 190, 192 at respective intermediate points and have a flange-like configuration. The attachments 130, 132 are preferably attached to the tubular loop 111 by welding. The attachments 131, 133, 130, 132 preferably include mounting apertures for receiving bolts or other suitable fastening arrangement.

Along the upper cross member 182, openings 142, 144 can be optionally provided to receive lights, and in particular flashing strobe lights. The rectangular openings are sized for receiving the housings of the lights within the hollow space of the tubular loop 111 and allowing at least a majority of the lenses to be visible. Among other possible mounting arrangements, the lights may be secured to the vehicle bumper 110 using fasteners extending through apertures formed in a rear side of the upper cross member 182. Wiring for the lights can be routed through the hollow interior of the tubular loop 111 as desired.

FIGS. 14-17 are additional views of the vehicle bumper 111 together with an intermediate lateral member 150 and a U-shaped resilient pad 160. As shown, the U-shaped pad 160 can be configured to extend from the left upright section 192 and along the bottom cross member 180 to the right upright section 190.

In some circumstances, providing the resilient pad 160 in a single piece has advantages, including an improved aesthetic appearance and better retention of the pad over time. As can be seen in FIGS. 19-22, the pad 160 can be provided with a substantially flat front surface as shown. A rear surface 168 can be contoured to complement the bumper 111, such as by having a curved surface as shown (see FIG. 22). In the illustrated implementation, the pad 160 is attached to the tubular loop 111 by pressing one way plastic fasteners extending from the rear surface of the pad 160 into corresponding holes in the front surface of the tubular loop 111. If needed, an adhesive can be applied to make the attachment more secure. As indicated, a logo, message or other insignia can be formed into the 160 as its front and center location on the vehicle is highly visible. In the illustrated implementation, the pad 160 can be made of a non-marking rubber having a durometer of 70 to 90. For example, a EPDM synthetic rubber having a durometer of approximately 80 can be used. Materials other than rubber having a sufficient resiliency and durability can also be used.

Figure 23:
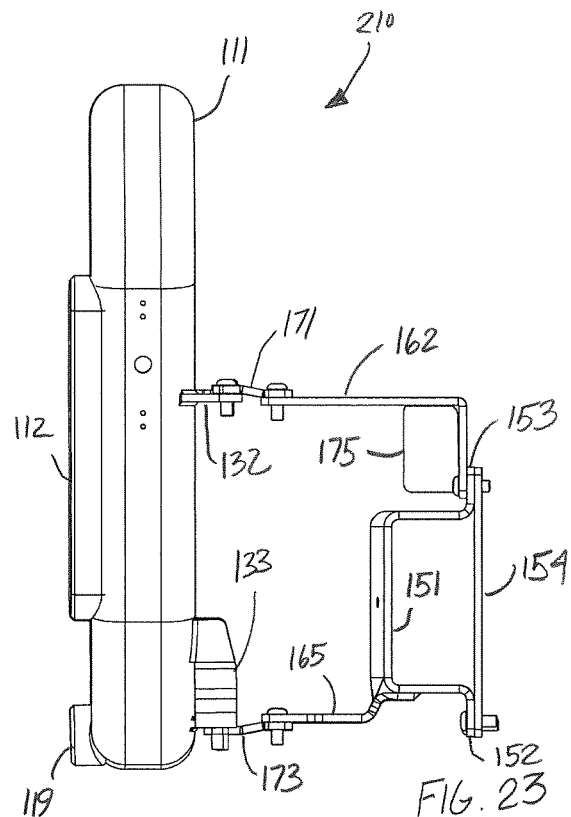
FIG. 23 is a side elevation view of an alternative vehicle bumper having showing bracket member connections to a vehicle's impact absorbing bumper.
Figure 24:
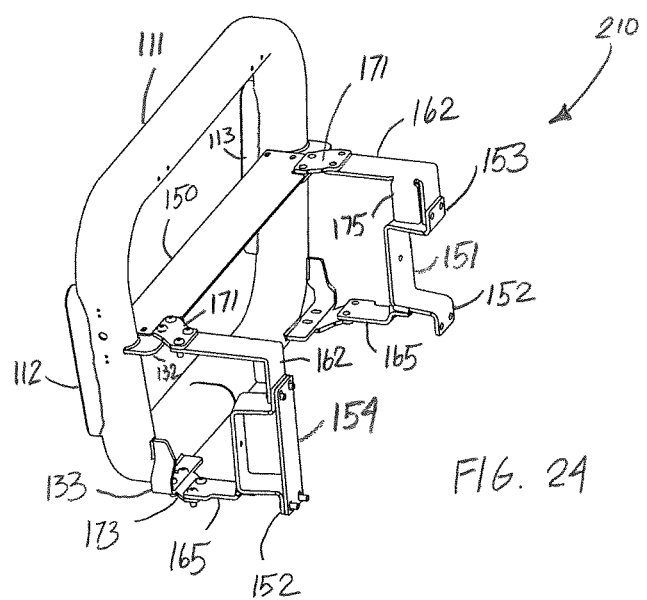
FIG. 24 is a left side and rear elevation view of the bumper of FIG. 23.

It should be emphasized that the pad can be provided in configurations other than the single piece configuration shown in FIGS. 19-22. As described above and shown somewhat schematically in FIG. 1, the bumper can be provided with two pads, each of which is mounted to one of the upright members (see FIG. 2) or three pads (see FIG. 3). More specifically, as shown in FIGS. 23-25, an alternative bumper 210 has two pads 112, 113 mounted to the respective upright sections of the tubular loop 111 and a third pad 119 mounted to the lower lateral member.

Referring again to FIGS. 14-17, the flange-like upper attachments 130, 132 provide support for the intermediate lateral member 150, sometimes referred to as a cross bar or a shelf. In the illustrated implementation, the member 150 need not be constructed to serve as a structural member in conjunction with the loop 111, but rather as a mounting location for accessories and for improving the overall aesthetic appearance. The member 150 can be shaped as shown to cover the attachments 130, 132, thus improving the aesthetic appearance of the bumper 111.

A right end 154 of the member 150 has apertures for mounting to the upper attachment 130. Similarly, a left end 152 has apertures for mounting to a left upper attachment 132.

FIG. 18 is an exploded view showing the vehicle bumper 110 in relation to the intermediate lateral member 150 and the U-shaped resilient pad 160.

The tubular loop 111 may be configured to have one or more holes for mounting accessories and providing access, such as for routing wires. For example, referring to FIG. 16, there may be mounting apertures 202, arranged in an upper pair and a lower pair and configured to receive fasteners for mounting axillary lights, on each of the upright sections 190, 192. There may be a larger aperture 204 for routing wire from the lights. Referring to FIG. 18, there may be an aperture 206 for routing wire positioned on an inner side of each of the upright sections.

The tubular loop 111 may have a junction, e.g., such as the junction 140. The junction can be configured such that the ends of the tubular loop are touching or nearly touching. In FIG. 18, the ends of the tubular loop 111 are welded together so that they are in contact along at least an upper surface. In some implementations, the ends are angled at 1 to 3 degrees from normal, and thus form a gap at the location of the junction.

For some implementations, including those with openings 142, 144, an opening 200 is provided at a lower surface of the lower cross bar, e.g., to allow any water that may have collected within the tubular loop 111 to be drained. Conveniently, the opening 200 may be positioned at about the location of the junction 140.

FIGS. 23-25 show additional details of brackets that extend through a vehicle's fascia (and/or other structure) for mounting the bumper 210 to the left and right sides of the vehicle's impact absorbing bumper, which is not shown in these figures, but has a cross-section that would occupy the space defined within the U-shaped bracket 151 and the back plate member 154. At an upper end 153 of the bracket 151, an upper bracket member 162 is attached. The upper bracket member 162 extends to attach to the attachment 132 (on the left side), or there can be a separate upper junction member 171 interposed between the upper bracket member 162 and the attachment 132 as shown in the figures. At a lower end 152 of the bracket 151, a lower bracket member 165 is attached. The lower bracket member 165 extends to attach to the attachment 133 (on the left side), or there can be a separate lower junction member 173 interposed between the lower bracket member 165 and the attachment 133 as shown in the figures. Preferably, the connections between the various members are made with conventional fasteners. The connections between the upper and lower junction members 171, 173 and the respective adjacent components can each be formed with two threaded fasteners as shown, or with a single threaded fastener. Each upper bracket member 162 can be formed with a bent tab 175 as shown.

In some implementations, the tubular loop is formed of aluminum. The desired cross-sectional shape may be formed by extruding aluminum. It is also possible to fabricate the tubular loop from steel or another suitable material. According to one implementation, the aluminum tubing would have outer dimensions of about 2.5 inches by about 3.4 inches and a thickness of about 0.25 inch. If steel tubing with the same outer dimensions is used, then the thickness can be reduced to 0.083 inch. The attachments 130, 132 and 131, 133 are preferably formed of aluminum.

According to some implementations of the method of making the bumper, the tubing is bent into the desired trapezoidal shape and then is heat treated. Any openings and holes in the bumper are preferably formed before heat treating.

What has been shown is a vehicle bumper for use with police and other emergency vehicles for pushing another vehicle which is fabricated of a tubular loop defining a generally oval cross-section. The oval cross-section tubular loop is oriented such that the major axis of the oval cross-section extends front to back with respect to the host vehicle while the minor axis extends up and down. The vehicle bumper further supports one or more resilient pads to aid in controlling the pushed vehicle and to cushion impact transfer between the bumper and the pushed vehicle. The inventive vehicle bumper is substantially stronger and substantially lighter in weight while simultaneously providing a more attractive front view cross-section when mounted on a host vehicle. A plurality of attachments are secured to the tubular loop and are used in securing the vehicle bumper to a suitable portion of a host vehicle.

In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

We claim:

1. A vehicle push bumper, comprising:
a lower lateral member;
an upper lateral member longer than the lower lateral member;
first and second slanted upright members extending between and connected to respective first ends and second ends of the lower lateral member and the upper lateral member, wherein the lower lateral member, first slanted upright member, upper lateral member and second slanted upright member form a loop having a generally trapezoidal profile, the loop having a generally oval cross-section and rounded junctions between adjacent members, the generally oval cross-section having a generally horizontal major axis and a generally vertical minor axis; and
first and second lower attachment brackets extending from a rear side of the loop along the first slanted upright member and the lower lateral member and the second slanted upright member and the lower lateral member, respectively; and
first and second upper attachment brackets extending from a rear side of the loop along the first slanted upright member and the second slanted upright member, respectively;
one or more pads fitted to cover a forward surface of the loop along the lower lateral member and at least a portion of the first slanted upright member and a portion of the second slanted upright member;
wherein the lower attachment brackets and the upper attachment brackets are configured for positioning the loop substantially vertically and at a forward position on a first vehicle forward of a conventional bumper position to enable contacting a second vehicle and pushing the the second vehicle with the loop under the first vehicle's forward motion.

2. The vehicle push bumper of claim 1, wherein the first and second upright members slant outwardly by about 7 to about 15 degrees from vertical.

3. The vehicle push bumper of claim 1, wherein the first and second upright members slant outwardly by about 10 degrees from vertical.

4. The vehicle push bumper of claim 1, further comprising an intermediate lateral member positioned between the lower and upper lateral members.

5. The vehicle push bumper of claim 1, wherein at least one of the upright members is formed with holes for mounting auxiliary lights and running wiring for the auxiliary lights.

6. The vehicle push bumper of claim 1, wherein the generally oval cross-section comprises generally semi-cylindrical forward and rearward portions and generally horizontal linear segments connecting the forward and rearward portions.

7. The vehicle push bumper of claim 1, wherein one of the first and second lateral members is formed with openings shaped to receive lights for recessed mounting within the bumper.

8. The vehicle push bumper of claim 1, further comprising an intermediate lateral member separate from the loop and configured to extend between the first and second upper attachment brackets.

* * * * *